(12) United States Patent
Mohammed et al.

(10) Patent No.: US 9,942,384 B2
(45) Date of Patent: Apr. 10, 2018

(54) METHOD AND APPARATUS FOR DEVICE MODE DETECTION

(71) Applicant: Motorola Mobility LLC, Libertyville, IL (US)

(72) Inventors: Ghouse Adoni Mohammed, Gurnee, IL (US); Craig J Detter, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1152 days.

(21) Appl. No.: 14/022,472

(22) Filed: Sep. 10, 2013

(65) Prior Publication Data

US 2015/0071090 A1    Mar. 12, 2015

(51) Int. Cl.
| | |
|---|---|
| *H04M 1/725* | (2006.01) |
| *H04W 4/02* | (2009.01) |
| *H04W 52/02* | (2009.01) |
| *H04W 4/04* | (2009.01) |
| *H04W 88/06* | (2009.01) |

(52) U.S. Cl.
CPC ....... *H04M 1/72569* (2013.01); *H04W 4/025* (2013.01); *H04W 4/046* (2013.01); *H04W 52/0254* (2013.01); *H04M 2250/06* (2013.01); *H04M 2250/10* (2013.01); *H04W 88/06* (2013.01); *Y02B 60/50* (2013.01)

(58) Field of Classification Search
CPC .................................. G01S 19/45; G01S 11/02
USPC .................................................. 342/357.35
See application file for complete search history.

(56) References Cited

U.S. PATENT DOCUMENTS

| | | |
|---|---|---|
| 6,098,118 A | 8/2000 | Ellenby et al. |
| 6,452,494 B1 | 9/2002 | Harrison |
| 6,529,144 B1 | 3/2003 | Nilsen et al. |
| 7,102,496 B1 * | 9/2006 | Ernst, Jr. ................. G08G 1/164 180/167 |
| 7,159,194 B2 | 1/2007 | Wong et al. |

(Continued)

FOREIGN PATENT DOCUMENTS

| | | |
|---|---|---|
| EP | 1785808 A1 | 5/2007 |
| WO | 2013040493 A1 | 3/2013 |
| WO | 2014035119 A2 | 3/2014 |

OTHER PUBLICATIONS

Beckler, "Accelerometer-Based Intertial Navigation," University of Minnesota Electrical and Computer Engineering Department, May 9, 2008, 17 pp.

(Continued)

*Primary Examiner* — Tashiana R Adams
*Assistant Examiner* — Helena H Seraydaryan
(74) *Attorney, Agent, or Firm* — Shumaker & Sieffert, P.A.

(57) ABSTRACT

A method on an electronic device is described. A first sensor of the electronic device scans for a first movement indication. A set of second sensors of the electronic device are activated based on the first movement indication. The set of second sensors scan for a respective set of second movement indications. The set of second movement indications are weighted based on a respective set of sensor weight values to obtain a weighted set of second movement indications. The weighted set of second movement indications is combined to determine a device mode of the electronic device. The device mode is updated based on the combination of the weighted set.

12 Claims, 3 Drawing Sheets

(56) References Cited

U.S. PATENT DOCUMENTS

| | | |
|---|---|---|
| 7,498,951 B2 | 3/2009 | Wardimon |
| 7,558,600 B2 | 7/2009 | Kang |
| 7,606,552 B2 | 10/2009 | Orr et al. |
| 7,656,393 B2 | 2/2010 | King et al. |
| 7,688,306 B2 | 3/2010 | Wehrenberg et al. |
| 7,826,874 B2 | 11/2010 | Fyke |
| 8,065,508 B2 | 11/2011 | Rubin et al. |
| 8,170,621 B1 | 5/2012 | Lockwood |
| 8,344,998 B2 | 1/2013 | Fitzgerald et al. |
| 8,560,004 B1 | 10/2013 | Tsvetkov et al. |
| 2003/0103091 A1 | 6/2003 | Wong et al. |
| 2005/0088522 A1 | 4/2005 | Creviston |
| 2005/0234676 A1 | 10/2005 | Shibayama |
| 2006/0161377 A1 | 7/2006 | Rakkola et al. |
| 2006/0204232 A1 | 9/2006 | Weinberg et al. |
| 2007/0004451 A1 | 1/2007 | Anderson |
| 2007/0010940 A1 | 1/2007 | Tan et al. |
| 2007/0036348 A1 | 2/2007 | Orr |
| 2007/0075965 A1 | 4/2007 | Huppi et al. |
| 2007/0156364 A1 | 7/2007 | Rothkopf |
| 2007/0161410 A1 | 7/2007 | Huang et al. |
| 2007/0259685 A1 | 11/2007 | Engblom et al. |
| 2008/0140868 A1 | 6/2008 | Kalayjian et al. |
| 2008/0234935 A1 | 9/2008 | Wolf et al. |
| 2009/0278738 A1 | 11/2009 | Gopinath |
| 2010/0079395 A1 | 4/2010 | Kim et al. |
| 2010/0090564 A1 | 4/2010 | Oh et al. |
| 2010/0181988 A1 | 7/2010 | Hong et al. |
| 2010/0235667 A1 | 9/2010 | Mucignat et al. |
| 2010/0302028 A1 | 12/2010 | Desai et al. |
| 2011/0070864 A1 | 3/2011 | Karam et al. |
| 2011/0093729 A1 | 4/2011 | Mucignat et al. |
| 2011/0167391 A1 | 7/2011 | Momeyer et al. |
| 2011/0251892 A1 | 10/2011 | Laracey |
| 2011/0312349 A1 | 12/2011 | Forutanpour et al. |
| 2012/0075451 A1 | 3/2012 | Raynor |
| 2012/0154292 A1 | 6/2012 | Zhao et al. |
| 2012/0188376 A1 | 7/2012 | Chatow et al. |
| 2012/0235790 A1 | 9/2012 | Zhao et al. |
| 2012/0254100 A1 | 10/2012 | Grokop et al. |
| 2012/0278744 A1 | 11/2012 | Kozitsyn et al. |
| 2012/0287035 A1 | 11/2012 | Valko et al. |
| 2012/0290252 A1 | 11/2012 | Abraham |
| 2012/0297226 A1 | 11/2012 | Mucignat et al. |
| 2013/0212416 A1 | 8/2013 | Crisan |
| 2014/0028477 A1 | 1/2014 | Michalske |
| 2014/0232569 A1* | 8/2014 | Skinder .................. G01C 21/16 340/989 |

OTHER PUBLICATIONS

Cochibo, "Arrow knows where you parked-Arrow Car Finder," Cochibo, Nov. 15, 2012, retrieved from <http:!/cochibo.com/arrow/>, 4 pp.

Cochibo, "Arrow knows where you parked-FAQ," Cochibo, Nov. 15, 2012, retrieved from <http://cochibo.com/arrow/faq/>, 2 pp.

Jophde, "Valet," Google Play, Apr. 3, 2014, retrieved from <https://play.google.com/store/apps/details?id=co.valetapp>, 3 pp.

Keyboard, "Auto-Finder—Android Apps on Google Play," Feb. 24, 2014, retrieved from, http://play.google.com/store/apps/details?id=com.keyboardr.parkingwithglass, 3 pp.

Khan et al., "A Feature Extraction Method for Realtime Human Activity Recognition on Cell Phones," Proc of International Symposium on Quality of Life Technology, Jun. 6, 2011, 6 pp.

Khan et al., "A Triaxial Accelerometer-Based Physical-Activity Recognition view Augmented-Signal Features and a Hierarchical Recognizer," IEEE Transactions on Information Technology in Biomedicine, vol. 14, No. 5, Sep. 2010, pp. 1166-1172.

Khan, "Human Activity Recognition Using a Single Tri-axial Accelerometer," Kyung Hee University—Department of Computer Engineering, Feb. 2011, 160 pp.

Lee et al., "Activity and Location Recognition Using Wearable Sensors," Pervasive Computing, Dec. 10, 2002, 9 pp.

Mannini et al., "Machine Learning Methods for Classifying Human Physical Activity from On-Body Accelerometers," MDPI—Open Access Sensors, Feb. 1, 2010, 22 pp.

Mathie, "Monitoring and Interpreting Human Movement Patterns Using a Triaxial Accelerometer," The University of New South Wales—Faculty of Engineering, Aug. 2003, 512 pp.

Subramanya et al., "Recognizing Activities and Spatial Context Using Wearable Sensors," Proc. of Conference on Uncertainty in AI (UAI), Jul. 2006, 10 pp.

Data Sheet "BMA 220 Digital, triaxial acceleration sensor," Bosch Sensortec, Document revision 1.15, Document release date Aug. 23, 2011, downloaded from http://ae-bst.resource.bosch.com/media/products/dokumente/bma220/bst-bma220-ds003-08.pdf, 63 pages.

U.S. Appl. No. 14/230,880, filed Mar. 31, 2014, Le Grand, et al.

Abbott et al., "Land-Vehicle Navigation Using GPS," Proceedings of the IEEE, vol. 87, No. 1, Jan. 1999, 18 pp.

Lipphardt, "MUG: Review of the 800si, Mike Lipphardt's Review of the 800si," retrieved from www.sds.com/mug/800si_review.html, accessed on Feb. 22, 2012, 6 pp.

Weston et al., "Modern inertial navigation technology and its application," Electronics & Communication Engineering Journal, Apr. 2000, 16 pp.

A Framework of Energy Efficient Mobile Sensing for Automatic User State Recognition, Wang et al., http://www.usc.edu/dept/ee/scip/assets/002/63910.pdf, Downloaded from the Internet on Jun. 11, 2013, pp. 2-4

Energy-Efficient Rate-Adaptive GPS-based Positioning for Smartphones Paek et al., http://www.inf.ed.ac.uk/teaching/courses/cn/papers/raps.pdf, Downloaded from the Internet on Jun. 11, 2013, pp. 6 and 8

* cited by examiner

METHOD AND APPARATUS FOR DEVICE MODE DETECTION

TECHNICAL FIELD

The disclosure relates to device mode detection by an electronic device.

BACKGROUND

Electronic devices, such as smartphones, tablets, and other electronics, are often used with applications ("apps") or operating systems that provide automated features to the user based on a location of the electronic device or an activity that a user of the electronic device is currently performing. The locations or activities may be categorized as "device modes." As one example, a user located in their home may wish to be notified by a loud ringtone when a call is received, while automatically silencing the ringtone when the user is located at their place of work. As another example, the user may wish to be notified by the loud ringtone when they are currently in a vehicle or on public transportation.

The smartphone may determine its location via the Global Positioning System (GPS) and provide the automated features based on the location or speed of the electronic device. For example, a location on or near a highway or at a high rate of speed may indicate that the electronic device is in a vehicle. However, the smartphone typically increases its power consumption in order to use the GPS feature. This increased power consumption reduces the smartphone's battery life more quickly. The smartphone may also determine its location by scanning for wireless access point IDs for WiFi networks and performing a lookup on each wireless access point ID for known associated locations. A speed may then be determined based on time taken to travel the distance between WiFi networks. However, frequent scanning and performing the lookup also typically increase the smartphone's power consumption and reduces the battery life more quickly.

Some smartphones provide a "vehicle mode" as an ability to identify that the user is traveling at vehicle speeds or in a vehicle in order to provide automated features to the user. The vehicle mode may not distinguish between a driver or passenger in the vehicle or between public transportation and private vehicles. The vehicle mode may be detected using accelerometer data. This accelerometer-based approach may reduce the power consumption as compared to the GPS or WiFi-based approaches. However, vehicle mode detection using accelerometer data may be inconsistent in detecting a vehicle in motion. For example, the vehicle motion is not generally detectable at stop lights because the vehicle (and thus the smartphone) may be stopped for a period of time. The accelerometer-based approach may generate false negatives, suggesting that the user has exited the vehicle, when in fact the user is still in the vehicle and simply at a stop light.

As another example of accelerometer-based inconsistencies, accelerometer data associated with vehicle motion may be similar to a walking motion. Therefore, the accelerometer-based approach is also a source of false positives, which occur when the vehicle mode is detected while the user is not in a vehicle. False positives and false negatives associated with vehicle mode may cause certain behavior of the smartphone, such as announcing incoming calls, text, or playing music at undesirable times. For example, the user could be sitting in a business meeting when the smartphone incorrectly detects the vehicle mode, causing vehicle-related features to be activated, possibly embarrassing the user and causing them to turn off the feature entirely.

BRIEF DESCRIPTION OF THE DRAWINGS

These and/or other embodiments will become apparent and more readily appreciated from the following description of the embodiments, taken in conjunction with the accompanying drawings of which.

DETAILED DESCRIPTION

While several methods or technologies (e.g., accelerometer, GPS, or WiFi) are available to a smartphone (or other electronic device) for determination of its location or a vehicle mode, it is desirable to efficiently use these methods to conserve the smartphone's battery life while increasing accuracy of the vehicle mode determination. A GPS sensor that determines the smartphone's location and speed allows for high accuracy, but with significant power consumption. A WiFi-enabled smartphone scans for wireless access point IDs for WiFi networks, which may then be used for determining the smartphone's location or speed with moderate accuracy. However, each scan consumes additional power. Detecting vehicle mode using the accelerometer allows for reduced power consumption, however, the false positive and false negative determinations do not provide sufficient accuracy.

The present disclosure is generally directed to a method and system for device mode detection by an electronic device. In particular, the disclosure is directed to reducing power consumption and increasing accuracy of device mode detection by an electronic device.

The present disclosure describes a method in an electronic device. A first sensor of the electronic device scans for a first movement indication. A set of second sensors of the electronic device are activated based on the first movement indication. The set of second sensors scan for a respective set of second movement indications. The set of second movement indications are weighted based on a respective set of sensor weight values to obtain a weighted set of second movement indications. The weighted set of second movement indications is combined to determine a device mode of the electronic device. The device mode is updated based on the combination of the weighted set.

The present disclosure describes another method in an electronic device. An accelerometer of the electronic device scans for an accelerometer movement indication. A GPS sensor, a WiFi sensor, and a location sensor of the electronic device are activated if the accelerometer movement indication is a vehicle mode indication. The GPS sensor, the WiFi sensor, and the location sensor scan for a GPS movement indication, a WiFi movement indication, and a location movement indication, respectively. The GPS movement indication, the WiFi movement indication, and the location movement indication are weighted based on a GPS weight value, a WiFi weight value, and a location weight value, respectively. The weighted GPS movement indication, the weighted WiFi movement indication, and the weighted location movement indication are combined to determine a device mode of the electronic device. The device mode is updated based on the combination of the weighted GPS movement indication, the weighted WiFi movement indication, and the weighted location movement indication.

The present disclosure describes an electronic device. The electronic device includes a non-transitory memory, a processor configured to retrieve instructions from the memory, an accelerometer, a GPS sensor, a WiFi sensor, and a location sensor. The electronic device is configured to scan with the accelerometer for a first movement indication. The electronic device is configured to activate a set of second sensors based on the first movement indication. The set of second sensors includes at least one of the GPS sensor, the WiFi sensor, or the location sensor. The electronic device is configured to scan with the set of second sensors for a respective set of second movement indications. The electronic device is configured to weight the set of second movement indications based on a respective set of sensor weight values to obtain a weighted set of second movement indications. The electronic device is configured to combine the weighted set of second movement indications to determine a device mode of the electronic device. The electronic device is configured to update the device mode based on the combination of the weighted set.

Figure 1:
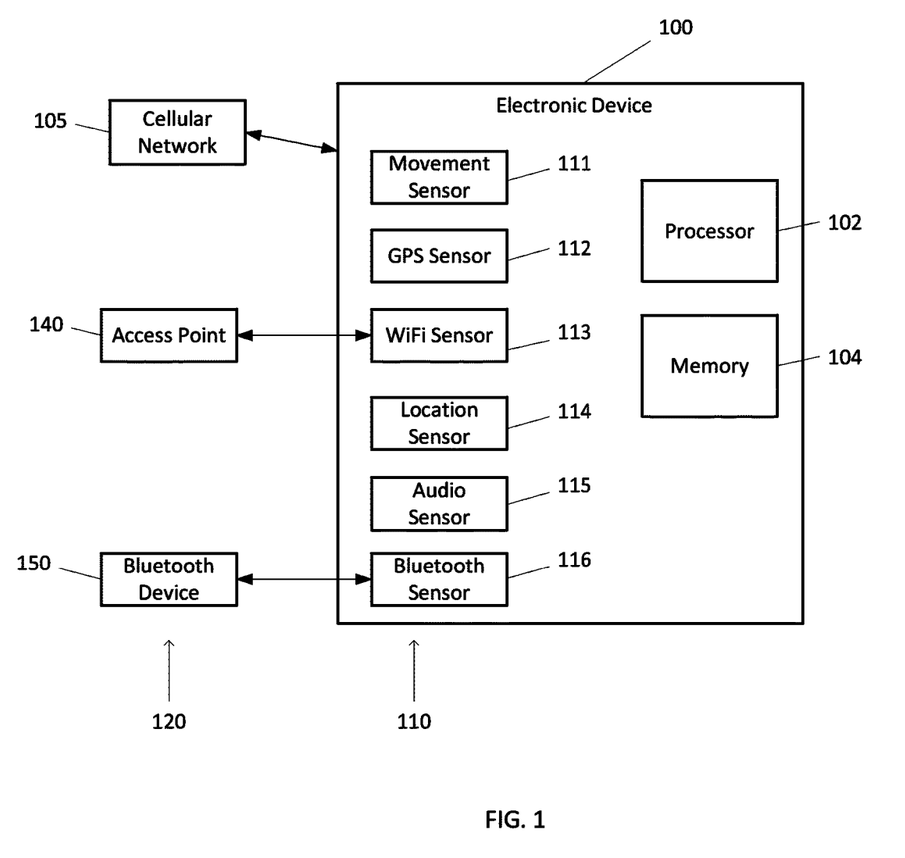
FIG. 1 is a block diagram illustrating an electronic device, according to an embodiment.

Turning to FIG. 1, a block diagram illustrates one example of an electronic device 100 according to an embodiment. Examples of the electronic device 100 include a mobile phone (e.g., smartphone), a tablet computer, a laptop, smart watch, or other computing device. The electronic device 100 in one example is configured to communicate over a cellular network 105, for example, a long term evolution (LTE) network, code division multiple access (CDMA) network, Universal Mobile Telecommunications System (UMTS) network, or other wireless network. The electronic device 100 includes a processor 102 and a memory 104, as described herein. The electronic device 100 further includes a plurality of sensors 110. In the embodiment shown in FIG. 1, the plurality of sensors 110 includes a movement sensor 111, a global positioning system ("GPS") sensor 112, a WiFi sensor 113, a location sensor 114, an audio sensor 115, and a Bluetooth sensor 116. However, alternative embodiments of the electronic device 100 may have additional, or fewer, sensors 110. While the sensors 110 are illustrated and described herein as discrete sensors, they may be combined or divided in alternative embodiments. The sensors 110 in one example are grouped into sets based on one or more characteristics, including their relative accuracy or relative power consumption.

The plurality of sensors 110 provides various features to the electronic device 100. The sensors 110 in one example are configured to detect, sense, or receive inputs from external devices (e.g., external devices 120), the user of the electronic device 100, or the environment. In particular, the sensors 110 are configured to detect, sense, or receive inputs that are used to detect a device mode of the electronic device 100. The electronic device 100 in one example determines the device mode based on movement indications received from the sensors 110. Examples of device modes include a vehicle device mode, walking device mode, office device mode, home device mode, or other device modes as will be appreciated by those skilled in the art. The electronic device 100 may be preconfigured with device modes or the device modes may be configured by the user. The device modes or corresponding device mode profiles may be updated by the electronic device 100 with additional movement indications, or existing movement indications may be updated, for example, to reflect a new vehicle in which the user travels.

The movement sensor 111 provides a movement analysis feature for the electronic device 100. The movement sensor 111 in one example includes one or more sensors (not shown) that sense motion inputs to the electronic device 100. Examples of the sensors include gyroscopes, accelerometers, motion sensors, or position sensors. The movement sensor 111 in one example is a low power consumption sensor (e.g., an accelerometer). The movement sensor 111 is configured to scan for a movement indication associated with a device mode. For example, the movement sensor 111 analyzes at least one of an orientation, rotation, or movement of the electronic device 100 to detect the movement indications. As one example, a walking device mode is associated with movement that typically occurs when the user is walking. As another example, a vehicle device mode is associated with a steady vibration (e.g., due to an engine), traveling over bumps in a road, or swaying back and forth inside a train car.

The movement sensor 111 in one example includes device mode profiles with at least one stored movement indication. In this case, the movement sensor 111 compares the scanned movement indication with the stored movement indications of the device mode profiles to determine a current device mode. The movement indications of the device mode profiles provide a "motion fingerprint" for various vehicles. The movement sensor 111 in one example provides the movement indication and, optionally, the current device mode determined by the movement sensor 111 to the electronic device 100. The movement indication may include a numerical value, percentage value, or other suitable indicator for comparison. For example, higher values indicate a higher likelihood that the electronic device 100 is moving (e.g., a stronger match to a stored movement indication).

The GPS sensor 112 provides GPS functionality to the electronic device 100. The GPS sensor 112 receives signals from external devices, including GPS satellites or location beacons (not shown). The GPS sensor 112 is configured to determine at least one movement indication, for example, a location or speed of the electronic device 100. The GPS sensor 112 then determines a current device mode based on the movement indications. For example, if the speed of the electronic device 100 is over a vehicle threshold (e.g., 6 miles per hour), the electronic device 100 selects the vehicle device mode. Alternative vehicle thresholds will be apparent to those skilled in the art, including a vehicle threshold based on the location of the electronic device 100. For example, the vehicle threshold may be a distance or proximity to highways, public transportation centers, rail lines, or other vehicle transit systems. The GPS sensor 112 may be configured to provide the movement indication and, optionally, the current device mode determined by the GPS sensor 112 to the electronic device 100. The movement indication may include a numerical value, percentage value, or other suitable indicator for comparison. For example, the numerical value may be selected to be between zero and 100, with higher values indicating a higher likelihood that the electronic device 100 is moving.

The WiFi sensor 113 provides a wireless network capability and allows the electronic device 100 to connect to one or more wireless-enabled communication devices or wireless networks, such as one or more wireless access points 140. The WiFi sensor 113 implements one or more wireless standards, such as one or more of the IEEE 802.11 family of standards. The WiFi sensor 113 in one example scans for wireless-enabled communication devices and identifies those devices by a unique ID, such as a hardware address (e.g., medium access control (MAC) address), service set identification (SSID), basic service set identification (BSSID), internet protocol (IP) address, or any combination thereof. The WiFi sensor 113 scans at fixed time intervals, as requested by an application or operating system, or in response to other inputs. The WiFi sensor 113 identifies unique IDs for wireless-enabled communication devices or networks that are detected, connected with the WiFi sensor 113, or both.

The WiFi sensor 113 is configured to determine at least one movement indication, for example, a location, speed, or access point turnover value of the electronic device 100. The WiFi sensor 113 is configured to determine a current device mode based on the movement indications. The WiFi sensor 113 may be configured to provide the movement indication and, optionally, the current device mode determined by the WiFi sensor 113 to the electronic device 100. The movement indication may include a numerical value, percentage value, or other suitable indicator for comparison. For example, the numerical value may be selected to be between zero and 100, with higher values indicating a higher likelihood that the electronic device 100 is moving. Wireless access points, such as the wireless access point 140 are generally in fixed positions (e.g., in a home or place of business), thus the WiFi sensor 113 may presume that when the detected unique IDs have changed, the electronic device 100 has moved to a new location. The Federal Communication Commission ("FCC") places limits on transmit output power for wireless access points, thus limiting a range for detection. In practice, this detection range may be up to a 300 meter radius, but typically is shorter due to interference or passing through structures. Accordingly, the WiFi sensor 113 may estimate a speed of the electronic device 100 based on a duration of time that the wireless access point 140 is detected. For example, the WiFi sensor 113 determines that the electronic device 100 has traveled up to 600 meters (e.g., twice the detection radius) over a time period if the wireless access point 140 is detected at the beginning of the time period and no longer detected at the end of the time period. The WiFi sensor 113 may also perform geolocation lookups for detected wireless access points to determine its location at various detection times. The WiFi sensor 113 then determines its speed based on the locations and detection times.

The WiFi sensor 113 in another example is configured to determine a movement indication (e.g., an access point turnover value) if the detected unique IDs are changing at a rate above a predetermined threshold (e.g., more than 20% between scans). In this case, the WiFi sensor 113 may presume that the electronic device 100 has moved to a new location that is within a detection range of newly detected wireless access points and outside of a detection range of previously detected wireless access points. Accordingly, a higher rate of change for detected unique IDs corresponds to a higher speed for the electronic device 100. For example, a 10% rate of change over a scan period of ten seconds may indicate a walking movement indication (e.g., a walking mode threshold) while a 20% rate of change (or higher) may indicate a vehicle movement indication (e.g., a vehicle mode threshold). If a car or public transportation vehicle has a wireless access points installed, the corresponding unique ID may be consistently detected even though the electronic device 100 is moving (e.g., within the car). In this case, the WiFi sensor 113 can maintain a blacklist where the unique ID may be ignored. Unique IDs to be ignored are determinable based on their detectability over distances larger than the typical detection range (e.g., approximately 600 meters).

The location sensor 114 provides a location service for the electronic device 100. For example, the location sensor 114 is configured to determine a current location of the electronic device 100 based on at least one of Global Positioning System (GPS) data, WiFi data (e.g., from the WiFi sensor 113 and wireless access point 140), Google® location services, cell IDs (e.g., from the cellular network 105), or any combination thereof. The location sensor 114 in one example provides a "meaningful location" for the electronic device 100, such as a user's home, place of business, school, or other location. The meaningful locations may be configured by the user or determined by the location sensor 114 (e.g., learned based on prior location history, unique IDs of the wireless access points 140, or other information). The location sensor 114 is configured to determine at least one movement indication, for example, the location of the electronic device 100. The location sensor 114 is configured to determine a current device mode based on the movement indication. For example, if the user is currently at home, they are less likely to be traveling in a vehicle. In one example, the location sensor 114 determines that the current device mode is not a vehicle device mode if the user is currently at home. The location sensor 114 may be configured to provide the movement indication and, optionally, the current device mode determined by the location sensor 114 to the electronic device 100. The movement indication may include a numerical value, percentage value, or other suitable indicator for comparison. For example, the numerical value may be selected to be between zero and 100, with higher values indicating a more important location in which the user does not want to be mistaken for being in a vehicle.

The audio sensor 115 provides an audio recording feature to the electronic device 100. Examples of the audio sensor 115 include a microphone or other audio capture device. The audio sensor 115 is configured for voice recognition of the user, speech recognition of the user, or other sounds associated with the environment (e.g., background noise). As one example, the audio sensor 115 uses voice recognition algorithms to recognize a keyword spoken by the user and captured as audio by the audio sensor 115. The audio sensor 115 is configured to scan for a movement indication by detecting audio sounds associated with movement. The audio sensor 115 may be configured to determine a current device mode based on the movement indications. As one example, a rhythmic sound of footsteps is associated with a walking device mode. As another example, a vehicle device mode is associated with an engine noise or with keywords typically spoken by the user when in a vehicle. The audio sensor 115 may be configured to provide the movement indication and, optionally, the current device mode determined by the audio sensor 115 to the electronic device 100. The movement indication may include a numerical value, percentage value, or other suitable indicator for comparison. For example, the numerical value may be selected to be between zero and 100, with higher values indicating a higher likelihood that the electronic device 100 is moving.

The Bluetooth sensor 116 provides a Bluetooth capability to the electronic device 100 and allows connectivity to one or more other Bluetooth-enabled devices, such as a Bluetooth device 150. Examples of the Bluetooth device 150 include a Bluetooth-enabled headset, Bluetooth-enabled automobile, or other Bluetooth-enabled device. The Bluetooth sensor 116 in one example detects Bluetooth-enabled devices and identifies those devices by a unique ID, such as a Bluetooth hardware address, Bluetooth device name, Bluetooth device class, or any combination thereof. The Bluetooth sensor 116 may identify unique IDs for Bluetooth-enabled devices that are detected, connected with the Bluetooth sensor 116, or both. The Bluetooth sensor 116 is configured to scan for a movement indication, for example, a location of the electronic device 100 within a vehicle or at the user's home. The Bluetooth sensor 116 may determine the location (and thus a device mode) based on detection of a Bluetooth device 150. As one example, detection of a Bluetooth-enabled car indicates a vehicle device mode. As another example, detection of a Bluetooth device 150 that is associated with the user's home (e.g., a Bluetooth-enabled stereo or television) indicates a home device mode. The Bluetooth sensor 116 may be configured to provide the movement indication and, optionally, the current device mode determined by the Bluetooth sensor 116 to the electronic device 100. The movement indication may include a numerical value, percentage value, or other suitable indicator for comparison. For example, the numerical value may be selected to be between zero and 100, with higher values indicating a higher likelihood that the electronic device 100 is moving.

The electronic device 100 is configured to use one or more of the plurality of sensors 110 in order to determine a device mode of the electronic device 100. The electronic device 100 may be configured to activate or deactivate the sensors 110 separately, in sets, or simultaneously. For example, the electronic device 100 activates a first set of sensors (e.g., the movement sensor 111) prior to activating a second set of sensors (e.g., the WiFi sensor 113). The electronic device 100 in one example combines movement indications from the sensors 110 in order to determine the device mode. In one example, the electronic device 100 weights the movement indications. Activation of the sensors 110 separately or in sets allows the electronic device 100 to initially use a low-power sensor (e.g., the movement sensor 111) to determine the device mode and then to activate other sensors 110 with higher accuracy, but higher power consumption, to validate the device mode. Additionally, the use of multiple sensors 110 helps to reduce false positive and false negative determinations of the device modes where the movement indications from the sensors 110 conflict with each other.

Figure 2:
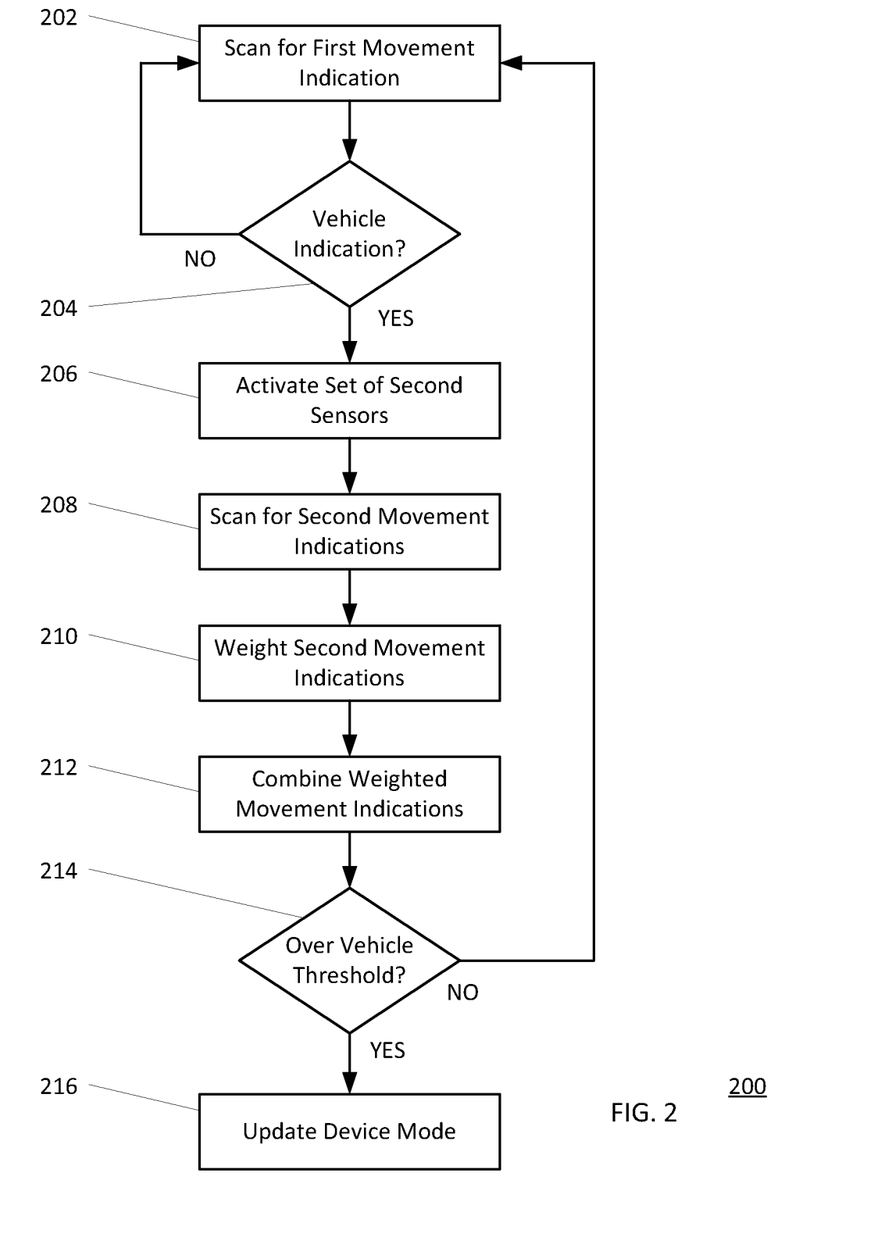
FIG. 2 is a flowchart of a method for updating a device mode that may be performed by the electronic device of FIG. 1, according to an embodiment.

Turning to FIG. 2, a flowchart 200 illustrates an embodiment of a method for updating a device mode that may be performed by the electronic device 100. The electronic device 100 may be in a first device mode and perform the method to change to a second device mode. In this example, the first device mode is a walking device mode. The electronic device 100 scans (202) for a first movement indication with a first sensor or set of sensors, for example, the movement sensor 111. The first sensor is selected based on the first (i.e., current) device mode. The first sensor scans continuously or intermittently. The electronic device 100 receives the first movement indication from the first sensor and determines (204) whether the first movement indication corresponds to a new (e.g., different) device mode. Alternatively, the electronic device 100 receives a device mode that has been determined by the first sensor. In the example shown, the electronic device 100 determines whether the first movement indication corresponds to a vehicle movement indication (or vehicle device mode) and if not, returns to scan for movement indications (202). The electronic device 100 may perform the determination (204) after receiving a single instance of the first movement indication or after multiple instances. For example, the electronic device 100 performs the determination based on two or more successive movement indications that are the same to reduce toggling between device modes.

If the first movement indication corresponds to the vehicle device mode (YES at 204), then the electronic device 100 activates (206) a set of second sensors based on the first movement indication. The set of second sensors are selected based on the first movement indication. For example, the electronic device 100 activates the GPS sensor 112 and the WiFi sensor 113 if the first movement indication corresponds to a vehicle device mode. As another example, the electronic device 100 activates the location sensor 114 if the first movement indication corresponds to a walking device mode (as determined at 204). The second set of sensors may be different from the first sensor or may include the first sensor.

After activation, the electronic device 100 scans (208) with the set of second sensors for a respective set of second movement indications. For example, the electronic device 100 receives a speed value from the GPS sensor 112 and an access point turnover value from the WiFi sensor 113. The electronic device 100 weights (210) the set of second movement indications based on a respective set of sensor weight values to obtain a weighted set of second movement indications. Sensor weight values for the sensors 110 may be based on the relative accuracy or a confidence level associated with the sensor. For example, a higher sensor weight value indicates a higher accuracy for the sensor. The sensor weight values may be fixed (e.g., default values based on the sensor or empirical values) or may be dynamic based on other factors (e.g., accuracy of the GPS sensor 112 may vary based on a number of GPS satellites detected). In another example, the sensor weight values are based on whether the movement indication from the sensor supports or contradicts a previous device mode, such as the device mode determined from the first movement indication. For example, a sensor that contradicts a previous device mode is given a lower sensor weight value to reduce false positive determinations. In one example, the sensor weight values are updated based on the device mode of the electronic device 100 and the second movement indication. For example, sensors that are consistently supported by movement indications of other sensors have their sensor weight value increased. Combinations of sensor weight values may also be used by the electronic device 100. The sensor weight values in one example are selected to be between zero and one and are multiplied with the movement indications.

After weighting, the electronic device 100 combines (212) the weighted set of second movement indications to determine the device mode of the electronic device. For example, the electronic device 100 combines the weighted set of second movement indications by addition, averaging, or other mathematical combination to obtain an overall movement indication or numerical value. If a sensor does not return a movement indication within a selected expiration time (e.g., within 40 seconds), that sensor may be ignored or given a lower value for the combination.

The electronic device 100 compares (214) the overall movement indication with a device mode threshold to determine whether the current device mode should be updated. The device mode threshold may be a fixed percentage or numerical value (e.g., 75% or a numerical value of 80) or other indicator for comparison. Alternatively, the device mode threshold may be dynamic, based on a number of sensors used, a current device mode, or other factors. The device mode thresholds may be the same or different for each device mode. If the overall movement indication does not meet the device mode threshold (NO at 214), the electronic device 100 returns to scan for movement indications (202). If the overall movement indication meets (YES at 214) the device mode threshold, the electronic device 100 updates (216) the current device mode to the new device mode.

After updating the current device mode, the electronic device 100 activates or deactivates one or more of the sensors 110 to scan for movement indications for a next device mode. In one example, the electronic device 100 toggles between device modes (e.g., between a vehicle device mode and a walking device mode) by alternating between configurations of activated or deactivated sensors 110. While only first and second sets of sensors have been described with respect to FIG. 2, in alternative embodiments, additional sets may be used based on the comparison (214) using the second set.

While the sensors 110 are selectively activated or deactivated for the purpose of determining the device mode, the sensors 110 can also be used for other features based on inputs from the operating system or the user of the electronic device 100. For example, the GPS sensor 112 is used in conjunction with a map application, the WiFi sensor 113 is used for wireless data transfer, or the audio sensor 115 is used to record speech. If the sensors 110 are activated separately for these features, then the electronic device 100 may opportunistically receive movement indications from the activated sensors 110.

Figure 3:
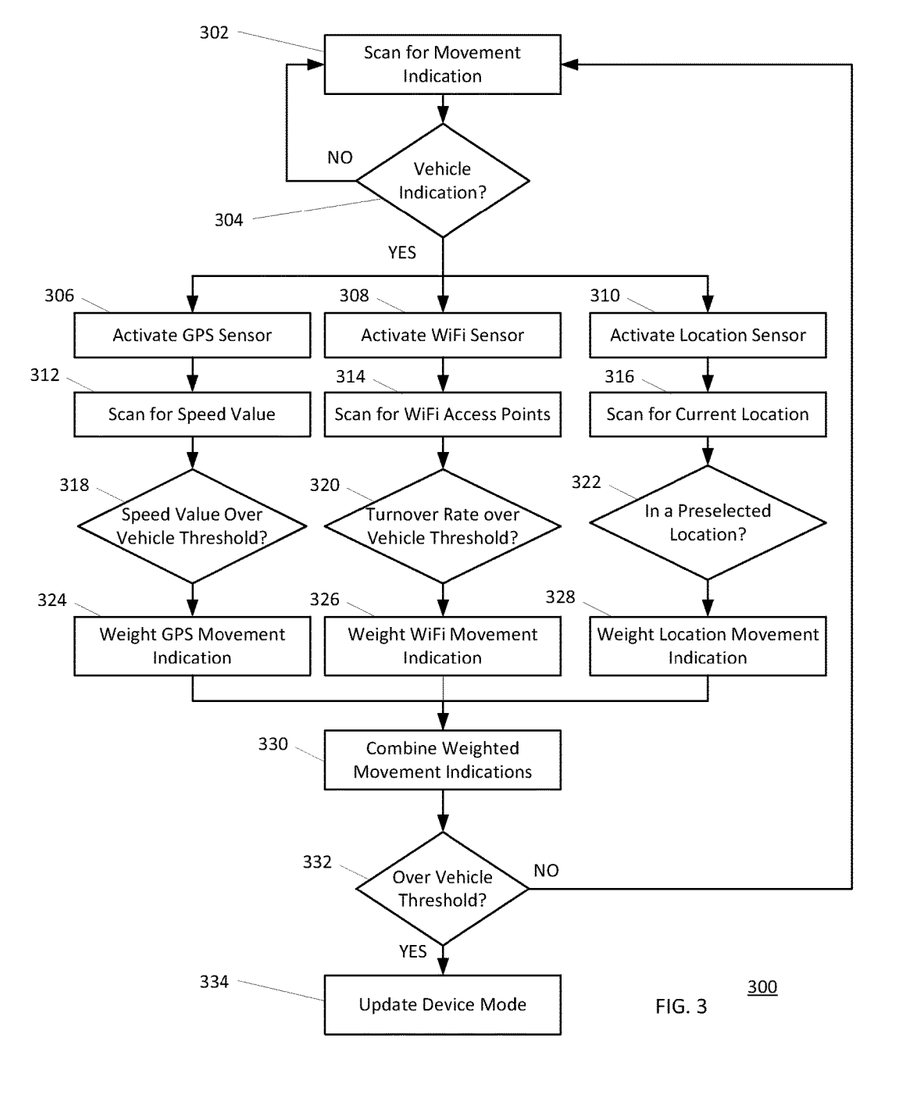
FIG. 3 is a flowchart of another method for updating the device mode that may be performed by the electronic device of FIG. 1, according to an embodiment.

Turning to FIG. 3, a flowchart 300 illustrates another embodiment of a method for updating a device mode that may be performed by the electronic device 100. In this example, the electronic device 100 starts in a walking device mode with an accelerometer (as the movement sensor 111) activated. The electronic device 100 scans (302) for an accelerometer movement indication with the movement sensor 111. The electronic device 100 receives the accelerometer movement indication and determines (304) whether the accelerometer movement indication corresponds to a vehicle device mode or vehicle movement indication and if not, returns to scan for movement indications (302).

If the accelerometer movement indication corresponds to the vehicle device mode (YES at 304), then the electronic device 100 activates (306, 308, 310) a set of second sensors that includes the GPS sensor 112, the WiFi sensor 113, and the location sensor 114. For simplicity, the set of second sensors as shown in the example of FIG. 3 includes only three sensors. Additional sensors (e.g., the audio sensor 115, the Bluetooth sensor 116, or other sensors) or fewer sensors may be used in other implementations.

After activation, the electronic device 100 scans with the set of second sensors for a respective set of second movement indications. The electronic device 100 scans (312) for a speed value (e.g., a GPS movement indication) with the GPS sensor 112, scans (314) for access points or an access point turnover value (e.g., a WiFi movement indication) with the WiFi sensor 113, and scans (316) for a current location (e.g., a location movement indication) with the location sensor 114.

After scanning, the electronic device 100 determines whether the respective movement indications meet the vehicle mode thresholds. The speed value may be compared (318) with a vehicle mode threshold for the GPS sensor 112, for example, a threshold of six miles per hour. If the speed value does not meet the threshold or the GPS sensor 112 does not return a speed value, the speed value does not support the accelerometer movement indication for the vehicle device mode, thus the electronic device 100 uses a sensor weight value of zero (or a similar low weight to reduce a likelihood of false positives). The access point turnover value may be compared (320) with a vehicle mode threshold for the WiFi sensor 113, for example, a threshold of 20% turnover. If the access point turnover value does not meet the threshold or the WiFi sensor 113 does not return an access point turnover value (e.g., due to an insufficient number of detected access points), the access point turnover value does not support the accelerometer movement indication, thus the electronic device 100 uses a sensor weight value of zero. The current location may be compared (322) with a list of meaningful locations for the electronic device 100. If the current location is a meaningful location, the current location does not support the accelerometer movement indication, thus the electronic device 100 uses a sensor weight value of zero.

The electronic device 100 in one example selects weights for the sensors 110 based on a signal or status of the electronic device 100. As one example, the electronic device 100 uses a lower weight for the GPS sensor 112 when it is located indoors (e.g., an "indoor" status). This reduces the effect of false speed values from the GPS sensor 112 due to multi-path reflection, which can occur indoors or in closed environments.

After selection of the weights, the electronic device 100 weights (324, 326, 328) the GPS movement indication, the WiFi movement indication, and the location movement indication. After weighting, the electronic device 100 combines (330) the weighted set of second movement indications to obtain an overall movement indication. The electronic device 100 compares (332) the overall movement indication with a device mode threshold to determine whether the current device mode should be updated. If the overall movement indication meets (YES at 332) the device mode threshold, the electronic device 100 updates (334) the current device mode to the new device mode. If the overall movement indication does not meet the device mode threshold (NO at 332), the electronic device 100 returns to scan for movement indications (302).

It can be seen from the foregoing that a method and system for device mode detection by an electronic device. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

We claim:

1. A method comprising:
   while an electronic device is operating in a first device mode, determining, by the electronic device and based on a first movement indication generated by a first movement sensor of the electronic device, whether the first movement indication corresponds to a vehicle movement indication, wherein the first movement sensor is included in a first set of movement sensors;
   responsive to determining that the first movement indication corresponds to the vehicle movement indication, temporarily activating, by the electronic device, a second movement sensor of the electronic device, wherein the first movement sensor consumes less power while active than the second movement sensor consumes while active, and wherein the second movement sensor is included in a second set of sensors different from the first set of sensors;
   weighting, by the electronic device and based on a type of the second sensor, a second movement indication generated by the second sensor by at least multiplying a value of the second movement indication by a weighting value associated with the type of the second sensor to obtain a weighted value of the second movement indication, wherein the weighting value is based on a relative confidence level associated with the second sensor;
   determining, by the electronic device, whether the weighted value of the second movement indication satisfies a threshold value; and
   responsive to determining that the weighted second movement indication satisfies the threshold value, changing, by the electronic device, from operating in the first device mode in which the first set of movement sensors is active to operating in a second device mode in which the second set of movement sensors is active.

2. The method of claim 1,
   wherein the first device mode is a walking mode and the second device mode is a vehicle mode.

3. The method of claim 1, further comprising:
   selecting, based on the first movement indication, the second movement sensor from one or more of a global positioning system sensor, a WiFi sensor, and a location sensor.

4. The method of claim 1, wherein the first movement sensor is an accelerometer.

5. The method of claim 1, wherein the second sensor is a global positioning system sensor, the method further comprising
   generating, by the global positioning system sensor, the second movement indication to determine a speed value for the electronic device,
   wherein weighting the second movement indication comprises multiplying the speed value by a weighting value associated with the global positioning system sensor to obtain a weighted speed value,
   wherein the threshold value is a threshold speed value, and
   wherein determining that the weighted second movement indication satisfies the threshold value comprises determining that the weighted speed value for the electronic device is greater than the threshold speed value.

6. The method of claim 1,
wherein the second movement sensor is a WiFi sensor,
wherein the second movement indication is an access point turnover value,
wherein weighting the second movement indication comprises multiplying the access point turnover value by a weighting value associated with the WiFi sensor to obtain a weighted access point turnover value,
wherein the threshold value is a threshold access point turnover value, and
wherein determining that the weight second movement indication satisfies the threshold value comprises determining that the weighted access point turnover value satisfies the threshold access point turnover value.

7. A method comprising:
while an electronic device is operating in a first device mode, determining, by the electronic device and based on an accelerometer movement indication, whether the accelerometer movement indications corresponds to a vehicle movement indication;
responsive to determining that the first movement indication corresponds to the vehicle movement indication, temporarily activating, by the electronic device, a GPS sensor, a WiFi sensor, and a location sensor of the electronic device;
weighting, by the electronic device, respective movement indications generated by the GPS sensor, the WiFi sensor, and the location sensor by at least multiplying a value of each of the respective movement indications by a corresponding weighting value associated each of the GPS sensor, the WiFi sensor, and the location sensors, wherein the weighting value is based on a relative confidence level associated with the sensor; and
changing, by the electronic device and based on a combination of the weighted movement indications, the electronic device from operating in the first device mode in which a first set of movement sensors is active to operating in a second device mode in which a second, different set of movement sensors is active.

8. The method of claim 7, further comprising:
weighting, by the electronic device and based on a weighting value associated with an audio sensor of the electronic device, an audio movement indication generated by the audio sensor,
wherein changing the electronic device from operating in the first mode to operating in the second mode is further based on the weighted audio movement indication.

9. An electronic device, the electronic device comprising:
a non-transitory memory;
a processor configured to retrieve instructions from the memory;
an accelerometer;
a global positioning system sensor;
a WiFi sensor; and
a location sensor,
wherein the processor executes the instructions to:
while an electronic device is operating in a first device mode, determine, based on an accelerometer movement indication, whether the accelerometer movement indications corresponds to a vehicle movement indication;
responsive to determining that the first movement indication corresponds to the vehicle movement indication, temporarily activate a set of second sensors based on the accelerometer movement indication, wherein the set of second sensors comprises at least two of the global positioning system sensor, the WiFi sensor, or the location sensor;
weight a set of second movement indications generated by the second set of sensors by at least multiplying a value of each movement indication of the set of second movement indications by a weighting value associated with a type of the sensor that generated the corresponding movement indication, wherein the weighting value is based on the relative confidence level associate with the sensor; and
change, based on a combination of the weighted set of second movement indications, the electronic device from operating in the first device mode in which a first set of movement sensors is active to operating in a second device mode in which a second, different set of movement sensors is active.

10. The electronic device of claim 9, wherein the processor executes the instructions to select the set of second sensors based on the first movement indication.

11. The electronic device of claim 9, wherein the set of second sensors includes the global positioning system sensor, wherein at least one of the second movement indications is generated by the global positioning system sensor, and wherein the processor executes the instructions to:
determine, based on the at least one second movement indication generated by the global positioning system sensor, a speed value for the electronic device;
weight the speed value by at least multiplying the speed value by a weighting value associated with the global positioning system sensor to obtain a weighted speed value, wherein the threshold value is a threshold speed value, and
determine that the weighted second movement indication satisfies the threshold value by at least determining that the weighted speed value satisfies the threshold speed value.

12. The electronic device of claim 9,
wherein the second movement indication is an access point turnover value,
wherein the processor executes the instructions to:
weight the access point turnover value by at least multiply the access point turnover value by a weighting value associated with the WiFi sensor to obtain a weighted access point turnover value, wherein the threshold value is a threshold access point turnover value; and
determine that the weighted second movement indication satisfies the threshold value by at least determining that the weighted access point turnover value satisfies the threshold access point turnover value.

* * * * *